United States Patent
Thom et al.

(10) Patent No.: US 9,767,304 B2
(45) Date of Patent: Sep. 19, 2017

(54) REPRESENTATION OF OPERATING SYSTEM CONTEXT IN A TRUSTED PLATFORM MODULE

(71) Applicant: Microsoft Technology Licensing, LLC, Redmond, WA (US)

(72) Inventors: Stefan Thom, Snohomish, WA (US); Ronald Aigner, Aigner, WA (US); Navin Pai, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 292 days.

(21) Appl. No.: 14/497,221

(22) Filed: Sep. 25, 2014

(65) Prior Publication Data

US 2016/0092691 A1  Mar. 31, 2016

(51) Int. Cl.
G06F 21/62 (2013.01)
H04L 29/06 (2006.01)
G06F 21/86 (2013.01)

(52) U.S. Cl.
CPC ...... *G06F 21/6218* (2013.01); *G06F 21/6209* (2013.01); *G06F 21/86* (2013.01); *H04L 63/20* (2013.01)

(58) Field of Classification Search
None
See application file for complete search history.

(56) References Cited

U.S. PATENT DOCUMENTS

| 6,119,230 | A | 9/2000 | Carter | |
|---|---|---|---|---|
| 7,275,263 | B2 * | 9/2007 | Bajikar | G06F 21/32 726/17 |
| 7,716,494 | B2 | 5/2010 | Liu et al. | |
| 7,836,299 | B2 | 11/2010 | England et al. | |
| 8,635,669 | B2 | 1/2014 | Iftode et al. | |
| 2008/0092216 | A1 * | 4/2008 | Kawano | G06F 21/46 726/5 |
| 2008/0313627 | A1 * | 12/2008 | Segawa | G06F 21/572 717/171 |
| 2009/0055641 | A1 * | 2/2009 | Smith | G06F 21/57 713/100 |
| 2009/0172328 | A1 * | 7/2009 | Sahita | G06F 12/1491 711/163 |
| 2011/0320816 | A1 | 12/2011 | Yao et al. | |
| 2012/0297455 | A1 * | 11/2012 | Novak | G06F 21/6218 726/4 |

OTHER PUBLICATIONS

"International Search Report and Written Opinion", Application No. PCT/US2015/051683, Dec. 11, 2015, 11 pages.

* cited by examiner

*Primary Examiner* — Kaveh Abrishamkar

(57) ABSTRACT

Techniques for representation of operating system context in a trusted platform module are described. In at least some embodiments, authorization principals that corresponds to representations of operating system context are derived in a trusted platform module. The authorization principals can be used to define authorization policies for access to security assets stored in a trusted platform module.

20 Claims, 7 Drawing Sheets

REPRESENTATION OF OPERATING SYSTEM CONTEXT IN A TRUSTED PLATFORM MODULE

BACKGROUND

As computers have become increasingly commonplace, increasing amounts of data have been stored on computers. This has many benefits for users, including the ability to store large amounts of data in relatively small spaces. However, some of this data is oftentimes intended to be kept secret or revealed to only certain individuals. This data can be protected in different manners, such as using passwords or personal identification numbers. Although such protection can be helpful, computers can be vulnerable to attacks such as dictionary attacks or brute force attacks where numerous attempts to guess the password or personal identification number are made. These vulnerabilities can lead to users having reduced trust in their computers, which detracts from a positive user experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for representation of operating system context in a trusted platform module are described. In at least some embodiments, authorization principals that corresponds to representations of operating system context are derived in a trusted platform module. The authorization principals can be used to define authorization policies for access to security assets stored in a trusted platform module.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for representation of operating system context in a trusted platform module are described. Generally, a trusted platform module refers to a functionality that is protected from general system access, such as a protected hardware and/or firmware environment. A trusted platform module, for instance, represents a tamper-resistant environment in which code can be safely executed.

According to various implementations, operating system context is expressed via authorization principals that are implemented via a trusted platform module. Generally, operating system context represents different identity-based state conditions that can occur in relation to an operating system. Examples of operating system context attributes include user identifiers, application and process identifiers, group identifiers (e.g., for user groups), privilege identifiers (e.g., for different access and security privilege levels), and so forth.

According to various implementations, authorization principals are defined based on operating system context. For instance, operating system context attributes are processed by a trusted platform module (TPM) access module to generate corresponding authorization principals. The authorization principals may be bound to security assets stored in a trusted platform module, such as security keys (e.g., private keys), security certificates, protected data, and so forth. For example, authorization policies may be configured with authorization principals to control access to bound security assets.

According to various implementations, techniques discussed herein enable operating system contexts to be represented in a trusted platform module, and thus increase system security over previous operating system implementations. Further, techniques discussed herein provide for a wide variety of operating-system related attributes to be characterized and represented in a trusted platform module, thus increasing the ability of existing trusted platform modules to protect security assets associated with different operating system contexts.

In the following discussion, an example environment is first described that is operable to employ techniques described herein. Next, a section entitled "Example Procedures" describes some example methods for representation of operating system context in a trusted platform module in accordance with one or more embodiments. Finally, a section entitled "Example System and Device" describes an example system and device that are operable to employ techniques discussed herein in accordance with one or more embodiments.

Example Environment

Figure 1:
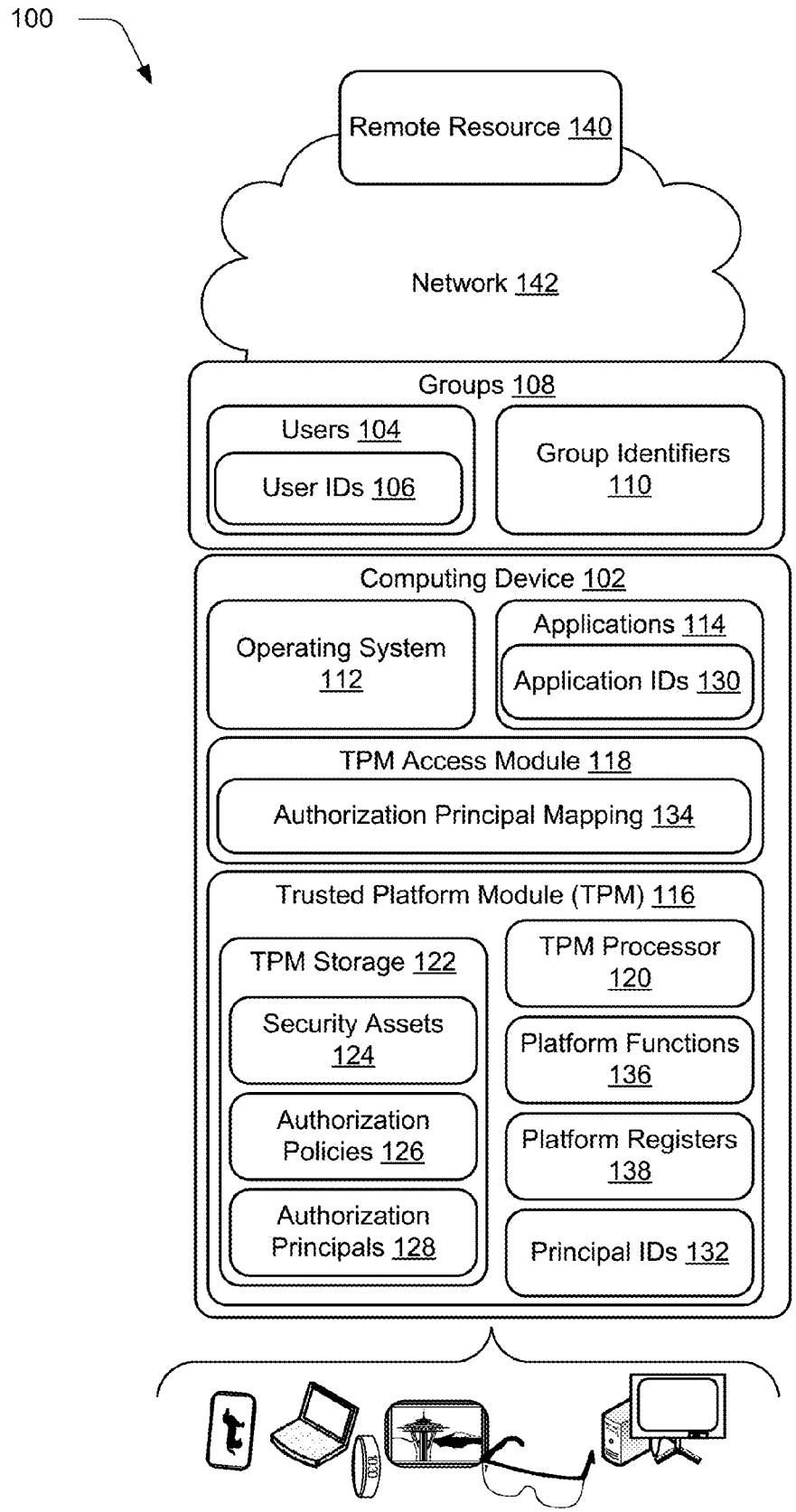
FIG. 1 is an illustration of an environment in an example implementation that is operable to employ techniques discussed herein in accordance with one or more embodiments.

FIG. 1 is an illustration of an environment 100 in an example implementation that is operable to employ techniques representation of operating system context in a trusted platform module discussed herein. Environment 100 includes a computing device 102 which can be embodied as any suitable device such as, by way of example and not limitation, a smartphone, a tablet computer, a portable computer (e.g., a laptop), a desktop computer, a wearable device, and so forth. One of a variety of different examples of a computing device 102 is shown and described below in FIG. 7.

Generally, the computing device 102 is accessible to various users 104, which are representative of individuals that may leverage the computing device 102 to perform various tasks. The users 104, for instance, may utilize the computing device 102 for productivity tasks (e.g., word processing, data manipulation, and so forth), for communication (e.g., email, social networking, and so forth), for content consumption (e.g., audio content, video content, and so forth), and for a variety of other tasks. The users 104 are associated with user identifiers (IDs) 106, which are representative of data that may be leveraged to identify individual users 104 and to differentiate individual users 104 from one another.

According to various implementations, the users 104 may be aggregated into different groups 108 based on different criteria. Individual of the groups 108, for instance, represent collections of users 104 that share common security and/or access privileges. The groups 108 are differentiated from one another via group identifiers (IDs) 110, which represent group names that may be used to distinguish one group 108 from another group 108.

The computing device 102 includes a variety of different functionalities that enable various activities and tasks to be performed, such as by the users 104. For instance, the computing device 102 includes an operating system 112 and applications 114. Generally, the operating system 112 is representative of functionality for abstracting various system components of the computing device 102, such as hardware, kernel-level modules and services, and so forth. The operating system 112, for instance, can abstract various components of the computing device 102 to the applications 114 to enable interaction between the components and the applications 114.

The applications 114 are representative of functionality to enable various tasks and activities to be performed via the computing device 102, such as word processing, web browsing, email, social media, enterprise tasks, and so forth. The applications 114 may be installed locally on the computing device 102 to be executed via a local runtime environment, and/or may represent portals to remote functionality, such as cloud-based services, web apps, and so forth. Thus, the applications 114 may take a variety of forms, such as locally-executed code, portals to remotely hosted services, and so forth.

The computing device 102 further includes a trusted platform module (TPM) 116, which is representative of a portion of the computing device 102 that protected from general access by most or all other functionalities of the computing device 102. The TPM 116 can be implemented in various ways, such as a separate, dedicated hardware environment (e.g., a dedicated chip), a subdivided portion of an existing hardware environment (e.g., a sub-portion of a central processing unit (CPU)), a protected firmware environment, and so forth. In one or more implementations, the TPM 116 is a module in accordance with a Trusted Platform Module (TPM) specification available from the Trusted Computing Group (TCG). This is not intended to be limiting, however, the TPM 116 may be implemented in a variety of other ways.

According to various implementations, interaction with the TPM 116 is brokered by a TPM access module 118. Generally, the TPM access module 118 is representative of functionality to enable different components of the computing device 102 to interact with the TPM 116, such as components of the operating system 112, the applications 114, the users 104, and so forth. In at least some implementations, the TPM access module 118 serves as the sole interface to the TPM 116. The TPM access module 118, for instance, represents a device driver for the TPM 116. The TPM access module 118 may be implemented in various ways, such as a component of the operating system 112, a separate system component of the computing device 102 (e.g., a kernel-level component), combinations thereof, and so forth.

The TPM 116 includes a TPM processor 120 and TPM storage 122. According to various implementations, the TPM processor 120 represents a dedicated hardware processing unit that can be leveraged by the TPM 116 to perform various processing tasks. The TPM storage 122 is representative of data storage capacity for the TPM 116 and that is protected from access by entities external to the TPM 116.

Stored on the TPM storage 122 are security assets 124, authorization policies 126, and authorization principals 128. Generally, the security assets 124 are representative of different types of security-related information that may be leveraged to verify the identities of certain entities, the authenticity and/or trusted status of various types of data, and so forth. Examples of the security assets 124 include security keys (e.g., cryptographic keys), security certificates, encryption and decryption algorithms, protected data, and so forth. While the authorization principals 128 are illustrated separately from other functionalities of the TPM 116, in at least some implementations an authorization principal 128 can be expressed by existing objects (e.g., a security assets 124) in the TPM. Details concerning ways in which the security assets 124 may be configured and leveraged are discussed below.

The authorization policies 126 are representative of different conditions, rules, parameters, and instructions for controlling access to the security assets 124. For instance, individual authorization policies 126 may be bound to individual security assets 124 such that access to individual security assets 124 may be controlled via respective authorization policies 126.

According to various implementations, the authorization principals 128 represent root objects that enable operating system (OS) contexts to be expressed to the TPM 116, such as for configuring the authorization policies 126 to control access to the security assets 124. Generally, OS contexts refers to different operating system attributes and parameters that occur in relation to different execution scenarios for the computing device 102. Examples of different OS context attributes that may be represented via the authorization principals 128 include the user IDs 106, the group IDs 110, application identifiers (IDs) 130 for the applications 114, and so forth. As further detailed below, the authorization policies 126 may be configured with one or more of the authorization principals 128 to bind individual security assets 124 to particular authorization policies 126.

In at least some implementations, the authorization principals 128 are individually identifiable via respective principal identifiers (IDs) 132, which each reference a different instance of the authorization principals 128. According to various implementations, individual principal IDs 132 are generated based on respective OS contexts for which a corresponding authorization principal 128 is created. For instance, a principal ID 132 that identifies a particular authorization principal 128 may be generated by hashing an identifier for a respective OS context to generate a digest of the OS context, such as a digest of a user ID 106, a group ID 110, an application ID 130, combinations thereof, and so forth.

Although the principal IDs 132 are illustrated as being implemented separately from the authorization principals 128, this is not intended to be limiting. For instance, in at least some implementations, the principal IDs 132 can be embedded within and/or implemented as part of the authorization principals 128. For instance, in at least some implementations, the principals IDs 132 may represent portions of the authorization principals 128 that are referenceable to identify and differentiate the different authorization principals 128.

As an additional or alternative implementation to utilizing the principal IDs 132, the TPM access module 118 may leverage authorization principal mapping 134 to maintain a mapping of OS context to corresponding authorization principals 128, and based on the authorization principal mapping 124 may utilize the authorization principals 128 to access security assets 124 bound to corresponding authorization principals 128 in the TPM 116.

TPM 116 further includes platform functions 136 and platform registers 138. The platform functions 136 represent various functions used for providing secure storage of information, such as authentication functions, key generation functions, encryption and decryption functions, context-related functions, and so forth. According to various implementations, the TPM access module 118 may interact with the platform functions 136 to generate and/or configure the authorization principals 128, the authorization policies 126, and so forth.

The platform registers 138 represent storage locations for storing system state and context information for the computing device 102. For instance, the platform registers 138 may be leveraged to store "measurements" of various system components, such as measurements of modules of the operating system 112 that are collected at a system boot time. In at least some implementations, the platform registers represent platform configuration registers (PCRs) of the TPM 116.

Generally, a "measurement" refers to a way of identifying and/or characterizing various device-related data, such as code modules of the computing device 102, configuration data of the computing device 102, and so forth. As used herein, the term "code module" generally refers to portions of executable code, such as portions of the applications 114, services, modules of the operating system 112, processes, various binaries and/or executables, and so forth. Examples of measurements include hash values generated from device-related data, data signatures, encrypted versions of device-related data and/or portions of device-related data, and so forth. A measurement, for instance, may be generated by applying a Secure Hash Algorithm (SHA) to device-related data, e.g., SHA-1, SHA-2, and so forth.

According to various implementations, measurements of device-related data may be generated at system boot time and stored in the platform registers 138. Generally, the platform registers 138 store sequences of measurements for device-related data of the computing device 102, with new values of a particular platform register 138 being computed by appending a new measurement to an existing register value and computing a hash of the concatenated value. This process may be repeated for multiple different instances of device-related data, e.g., multiple code modules. According to various implementations, a subsequent determination as to whether particular device-related data (e.g., a code module) was loaded can be performed by calculating a hash of device-related data based on the process used to calculate a current value for a platform register 138. The calculated hash is then compared to a value stored in the platform register 138 to ascertain whether the hash matches the value. If the hash matches the value, this indicates that the code module has been loaded and that a current version of the code module matches the version that was measured in the platform register 138.

For instance, when a particular code module requests access to a protected resource (e.g., to a security asset 124), the current measurements in the platform registers 138 can be compared to the values stored in the authorization policy 126 for this security asset 124. If the values match, it can be determined that the system has not changed from its original state when the authorization policy 126 was configured, and is thus safe and can be allowed access to the protected resource. If the measurements don't match, it may be determined that the state of the computing device is not safe, and thus access to the protected resource may be denied. Generally, the process of comparing measurements of code modules is referred to as "attestation."

The environment 100 also includes a remote resource 140, which is representative of various types of resources that may be communicatively accessible to the computing device 102 via a network 142. Examples of the remote resource 140 include a website, a content store, a network-hosted application (e.g., a web app), a network-hosted service, a social media platform, and so forth. Generally, the remote resource 140 represents any type of resource that the computing device 102 may interact with, such as to access content, services, and so forth. The remote resource 140 can be implemented via various types and/or combinations of computing devices, examples of which are described below in FIG. 7.

The one or more networks 142 are representative of networks via which various entities of the environment 100 may communicate. The network(s) 142 may assume a variety of different configurations, such as a local area network (LAN), a wide area network (WAN), the Internet, and so on. In at least some embodiments, functionalities discussed with reference to the environment 100 and/or other portions of the discussion herein may be implemented in a distributed environment (e.g., "over the cloud"), as further described in relation to FIG. 7.

Figure 2:
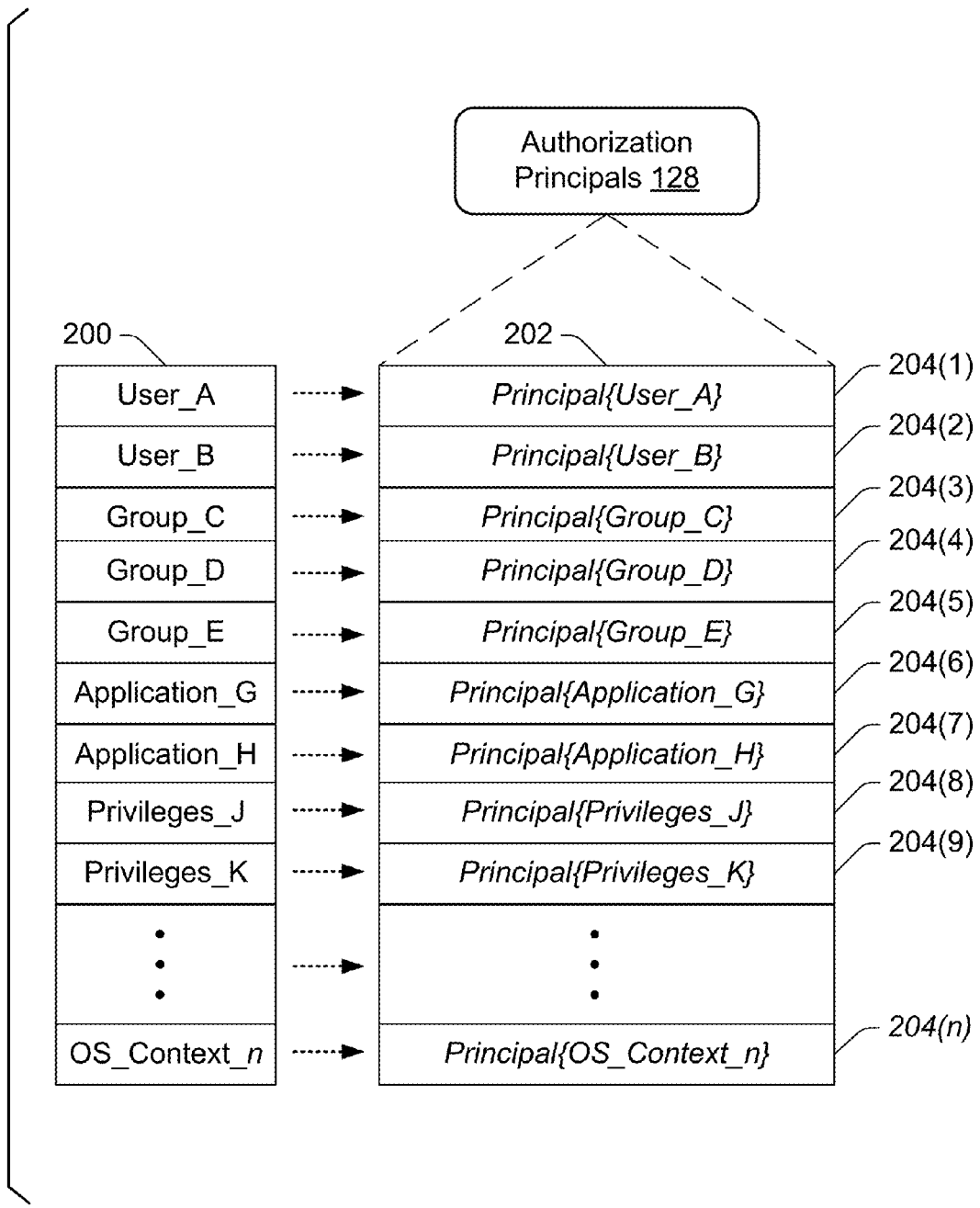
FIG. 2 illustrates example implementations of authorization principals in accordance with one or more embodiments.

FIG. 2 illustrates example implementations of the authorization principals 128 in accordance with one or more implementations. As referenced above, the authorization principals 128 are derived based on different OS contexts that can occur on the computing device 102, such as identifiers for different entities that interact with the operating system 112.

Included in FIG. 2 is a set of OS contexts 200 that represent different OS-related identities and attributes that can be used to derive authorization principals 128. Further illustrated is a set of authorization principals 202 that are derived based on the OS contexts 200. According to various implementations, the authorization principals 202 can be derived in a variety of different ways. For instance, the TPM 116 can sign values of the OS contexts 202 with a key that is internal to the TPM 116 (e.g., an endorsement key) to generate the authorization principals 202.

The authorization principals 202 include (n) authorization principals 204(1), . . . , 204(n). The authorization principals 204(1), 204(2) are derived from user identifiers that can be used to distinguish different users from one another, such as the user IDs 106 introduced above. The authorization principals 204(3), 204(4), 204(5) are derived from group identifiers that can be used to distinguish groups from one another, such as the group IDs 110 introduced above.

The authorization principals 204(6), 204(7) are derived from application identifiers that can be used to distinguish applications from one another, such as the application IDs 130 introduced above. The authorization principals 204(8), 204(9) are derived from privilege identifiers that can be used to distinguish different privilege levels from one another, such as for access privileges, security privileges, interaction privileges, and so forth. These example authorization principals are presented for purpose of illustration only, and it is to be appreciated that a wide variety of other types and instances of authorization principals may be employed within the spirit and scope of the disclosed implementations.

According to various implementations, individual of the authorization principals 202 can be combined in different ways to characterize different combinations of OS contexts that may occur in varying execution scenarios.

Figure 3:
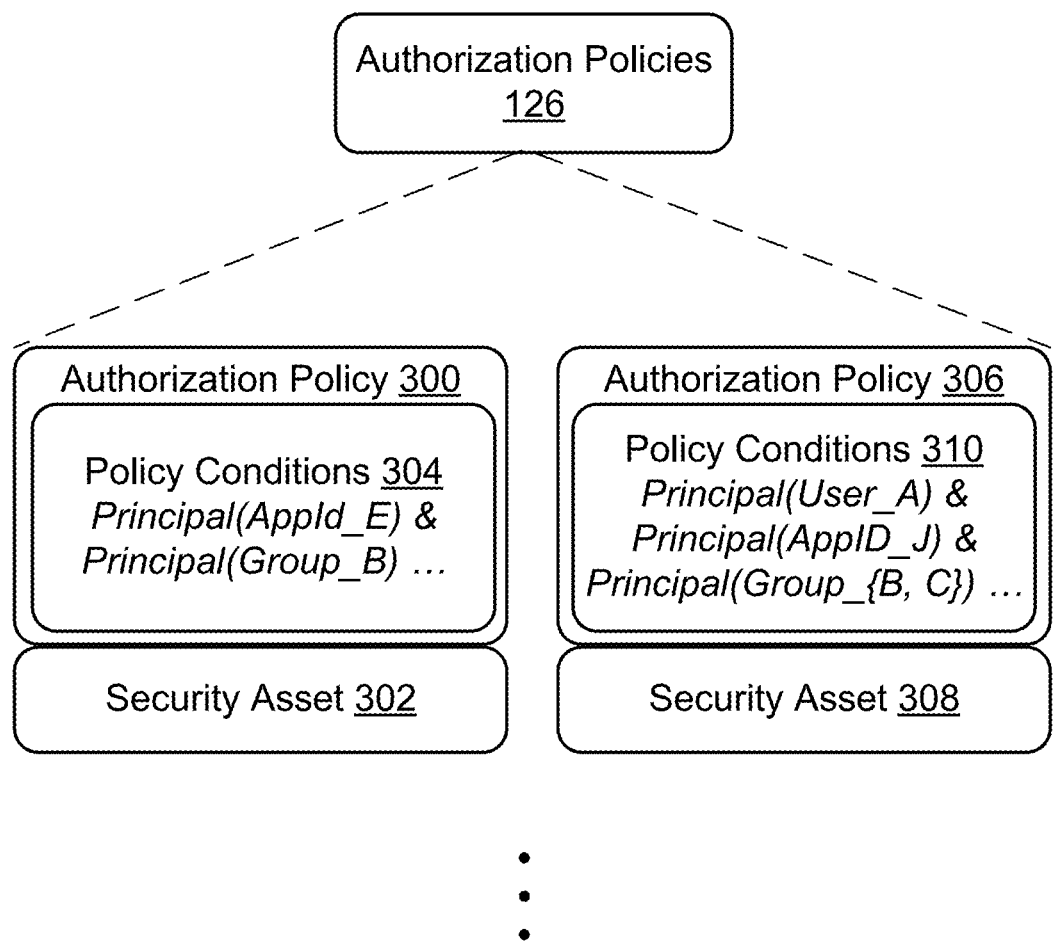
FIG. 3 illustrates example implementations of authorization policies in accordance with one or more embodiments.

FIG. 3 illustrates example implementations of the authorization policies 126 in accordance with one or more implementations. The authorization policies 126 include an authorization policy 300 which is bound to a security asset 302. According to various implementations, the security asset 302 represents an instance of the security assets 124, introduced above. The authorization policy 300 includes policy conditions 304 that specify various conditions to be satisfied to allow access to the security asset 302. In this particular example, the policy conditions 304 specify a set of authorization principals that are to be applied before access to the security asset 302 is permitted.

For instance, the policy conditions 304 specify authorization principals of Principal(AppID_E) and Principal (Group_B). Thus, if a requesting party is validated (e.g., attested) as having access to both the Principal(AppID_E) and Principal(Group_B), the party will be allowed access to the security asset 302. On the other hand, if a requesting party does not have access to one or more of the Principal (AppID_E) and Principal(Group_B) principals, the requesting party will be denied access to the security asset 302.

The authorization policies 126 further include an authorization policy 306 which is bound to a security asset 308. According to various implementations, the security asset 308 represents an instance of the security assets 124, introduced above. The authorization policy 302 includes policy conditions 310 that specify various conditions to be satisfied to allow access to the security asset 308. In this particular example, the policy conditions 310 specify a set of authorization principals that are to be applied before access to the security asset 308 is permitted.

For instance, the policy conditions 310 specify authorization principals of Principal(User_A), Principal(AppID_J), and Principals(Group_{B,C}). Thus, if a requesting party is validated as having access to both the Principal(User_A) and Principal(AppID_J) principals, and at least one of the Principal(Group_{B,C}) principals, the party will be allowed access to the security asset 308. On the other hand, if a requesting party does not have access to one or more of the Principal(User_A), Principal(AppID_J), and at least one of the Principal(Group_{B, C} principals, the requesting party will be denied access to the security asset 308.

These authorization policy configurations are presented for purpose of example only, and it is to be appreciated that authorization policies can be configured in a variety of different ways to reflect a diverse array of different authorization principal configurations and combinations.

Having described an example environment in which the techniques described herein may operate, consider now a discussion of some example procedures in accordance with one or more embodiments.

Example Procedures

The following section describes some example procedures for representation of operating system context in a trusted platform module in accordance with one or more embodiments. The example procedures may be employed in the environment 100 of FIG. 1, the system 00 of FIG. 7, and/or any other suitable environment. The procedures, for instance, may be performed by the computing device 102, such as via the TPM access module 118. In at least some embodiments, steps described for the various procedures are implemented automatically and independent of user interaction.

Figure 4:
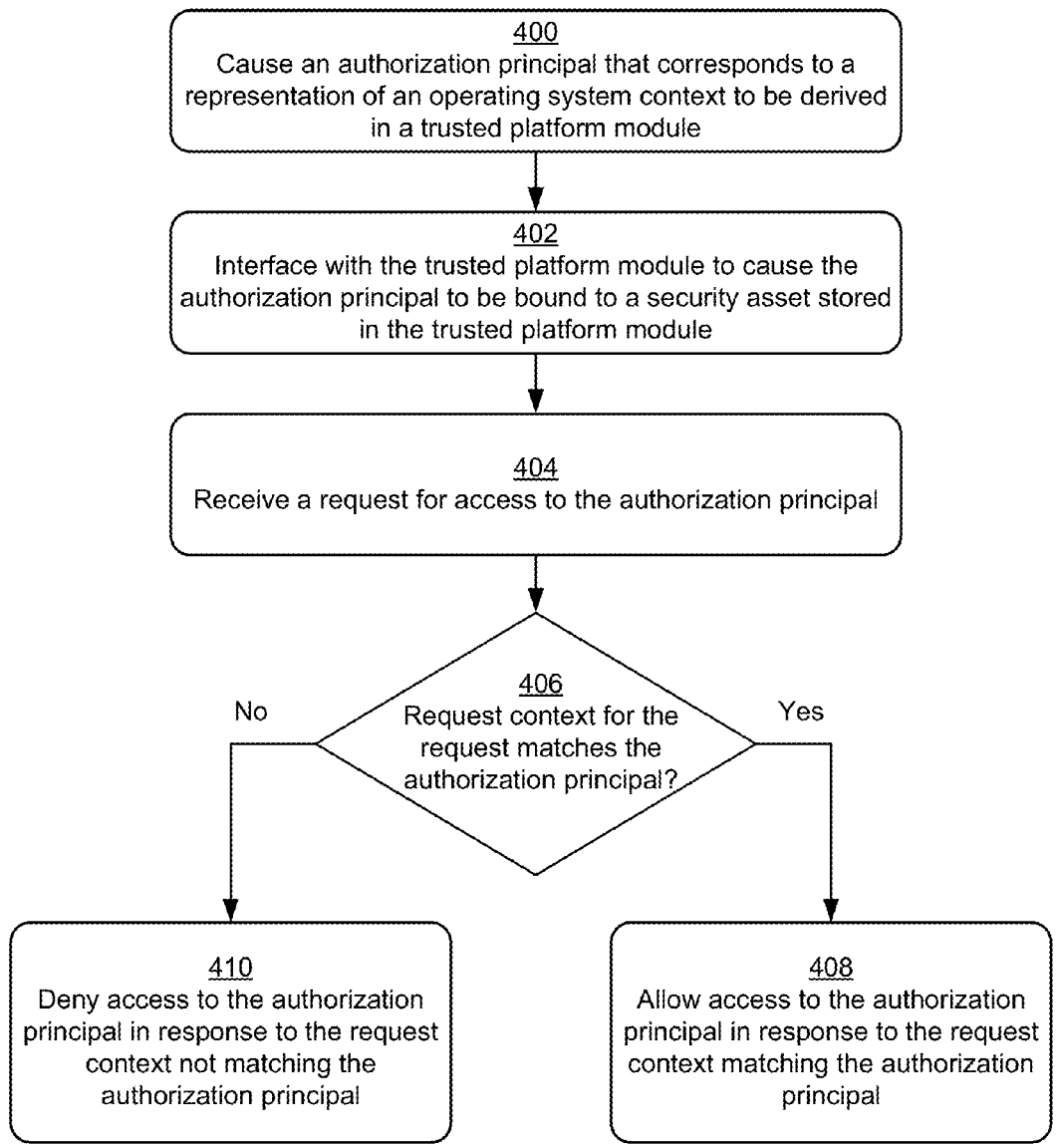
FIG. 4 is a flow diagram that describes steps in a method for deriving an authorization principal in accordance with one or more embodiments.

FIG. 4 is a flow diagram that describes steps in a method in accordance with one or more embodiments. The method, for instance, describes an example procedure for deriving an authorization principal in accordance with one or more embodiments.

Step 400 causes an authorization principal that corresponds to a representation of an operating system context to be derived in a trusted platform module. Generally, an operating system (OS) context represents different identity-based state conditions that can occur in relation to an operating system. For instance, the TPM access module 118 receives a request from a process (e.g., from an application 114, a system process, and so forth) to generate an authorization principal. Generally, the process represents any process that may execute on the computing device externally to the TPM 116, such as an application process, a system process, and so forth.

The authorization principal, for instance, is based on an operating system context associated with the process. Thus, the TPM access module 118 causes the authorization principal to be derived in the TPM 116. For instance, OS context data (e.g., User ID, Application ID, and so forth) is processed by the TPM 116 using a key that is secure to the trusted platform module (e.g., a primary key, a root key, and so forth) to derive the authorization principal. Thus, individual authorization principals 128 can be created for a variety of different OS contexts.

Step 402 interfaces with the trusted platform module to cause the authorization principal to be bound to a security asset stored in the trusted platform module. For instance, the TPM access module 118 causes an authorization policy 126 to be configured with the authorization principal such that access to the security asset is conditioned on the authorization policy 126 being satisfied.

Step 404 receives a request for access to the authorization principal. For example, a process requests access to the authorization principal to enable access to the security asset bound to the authorization principal.

Step 406 ascertains whether a request context for the request matches the authorization principal. The request context, for instance, corresponds to an OS context for a process that requests access to the authorization principal. Examples of the OS context include a user identifier associated with the process, an application identifier associated with the process, a group identifier associated with the process, a privilege level associated with the process, and so forth.

According to various implementations, ascertaining whether the request context matches the authorization principal includes proving access to the authorization principal by recreating the authorization principal based on the request context, e.g., a provided OS context. For instance, a key (a primary and/or root key) used to generate the authorization principal is applied to process the request context. The processed request context is then compared to the authorization principal to ascertain whether the processed request context matches the authorization principal. By re-creating the authorization principal based on the request context (e.g., a current OS context), an associated authorization policy can be utilized to ascertain whether access to an authorization principal is permitted.

If the request context for the request matches the authorization principal ("Yes"), step 408 allows access to the authorization principal in response to the request context matching the authorization principal. In at least some implementations, access to the authorization principal enables access to the security asset bound to the authorization principal. For instance, the request for access to the authorization principal can be forwarded to the TPM 116, which may allow access to the security asset in response to the request context satisfying an authorization policy for the security asset.

As referenced above, matching a request context to an authorization principal may include attempting to recreate an authorization principal by applying a key used to generate the authorization principal to a request context. Thus, if the authorization principal is successfully recreated using the request context, access to the authorization principal is permitted.

If the request context for the request does not match the authorization principal ("No"), step 410 denies access to the authorization principal in response to the request context not matching the authorization principal. The TPM access module 118, for instance, prevents the request for access to the authorization principal from being forwarded to the TPM 116.

As referenced above, matching a request context to an authorization principal may include attempting to recreate an authorization principal by applying a key used to generate the authorization principal to a request context. Thus, if the authorization principal not successfully recreated using the request context, access to the authorization principal is not permitted.

Figure 5:
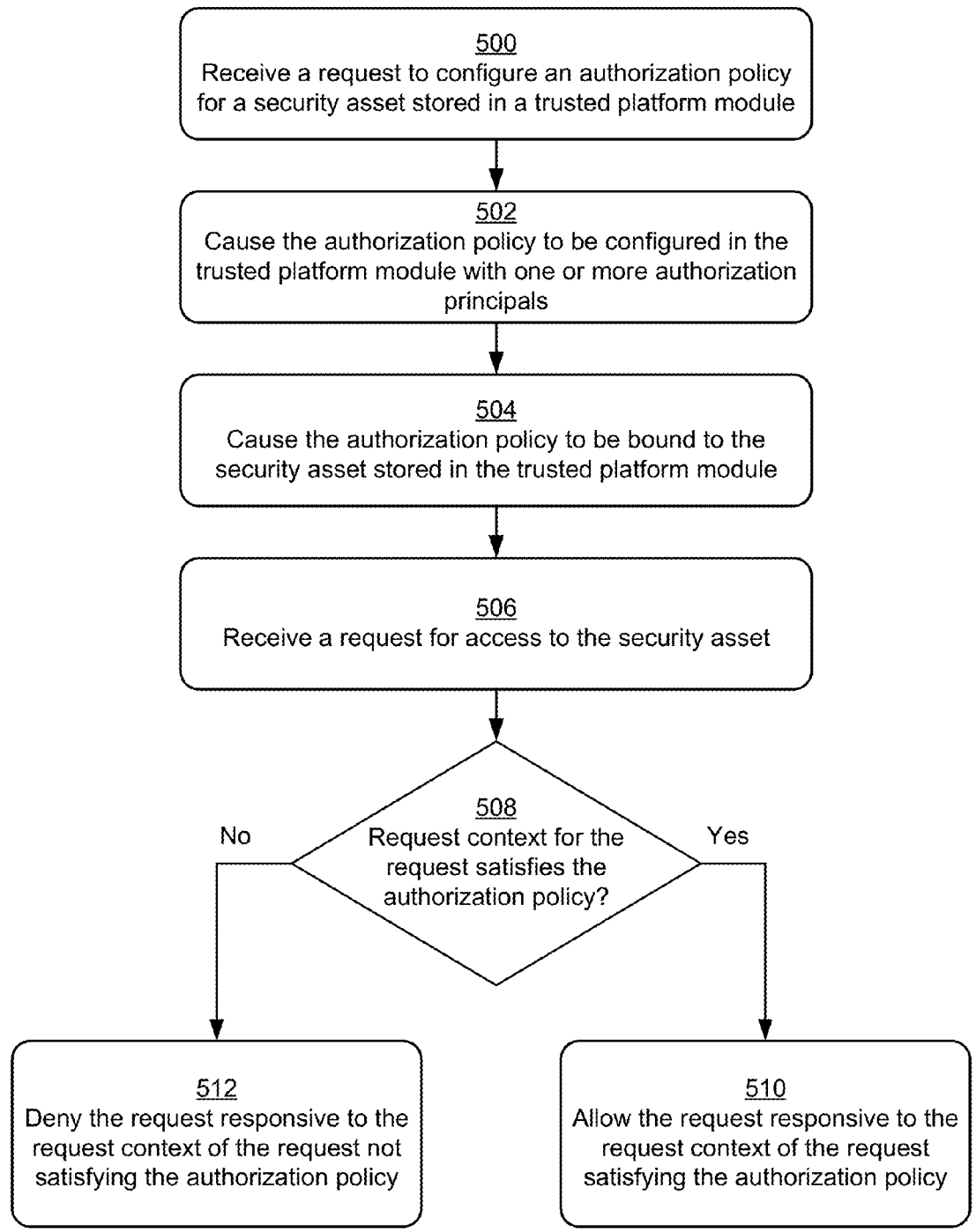
FIG. 5 is a flow diagram that describes steps in a method for binding an authorization policy to a security asset in accordance with one or more embodiments.

FIG. 5 is a flow diagram that describes steps in a method in accordance with one or more embodiments. The method, for instance, describes an example procedure for binding an authorization policy to a security asset in accordance with one or more embodiments.

Step 500 receives a request to configure an authorization policy for a security asset stored in a trusted platform module. The request, for instance, is received from an application and/or other process that resides locally on the computing device 102. Alternatively, the request may be received from a remote entity, such as the remote resource 140. According to various implementations, the request identifies one or more authorization principals that individually correspond to one or more representations of one or more operating system contexts. In at least some implementations, the security asset represents an implementation of the security assets 124 introduced above.

Step 502 causes the authorization policy to be configured in the trusted platform module with the one or more authorization principals. The TPM access module 118, for instance, communicates the one or more authorization principals to the TPM 116, which populates an authorization policy 126 with the one or more authorization principals.

Step 504 causes the authorization policy to be bound to the security asset stored in the trusted platform module. For example, the TPM access module 118 indicates to the TPM 116 that the authorization policy is to be bound to the security asset. According to various implementations, allowing a request for access to the security asset is conditioned on a request context matching the one or more authorization principals of the authorization policy.

Step 506 receives a request for access to the security asset. A process running on the computing device 102, for instance, requests access to the security asset.

Step 508 ascertains whether a request context of the request satisfies the authorization policy. For instance, it is determined whether the request context matches one or more authorization principals specified by the authorization policy. As referenced above, the request may be initiated by a process running on the computing device 102, such as associated with one of the applications 114. Thus, the request context may include one or more OS contexts associated with the process, examples of which are detailed above.

According to various implementations, ascertaining whether a request context satisfies an authorization policy includes attempting to recreate one or more authorization principals bound to the authorization policy. For instance, a key used to generate the one or more authorization principals is applied to the request context. Thus, access to the one or more authorization principals is based on whether the one or more authorization principals are successfully recreated using the request context.

If the request context of the request satisfies the authorization policy ("Yes"), step 510 allows the request responsive to the request context of the request satisfying the authorization policy. For instance, if one or more authorization principals bound to the authorization policy are successfully recreated using the request context, the request for access to the security asset is allowed. According to various implementations, allowing the request enables the requesting entity to access the security asset.

If the request context of the request does not satisfy the authorization policy ("No"), step 512 denies the request responsive to the request context of the request not satisfying the authorization policy. For instance, if one or more authorization principals bound to the authorization policy are not successfully recreated using the request context, the request for access to the security asset is denied. The requesting entity, for instance, is denied access to the security asset.

Figure 6:
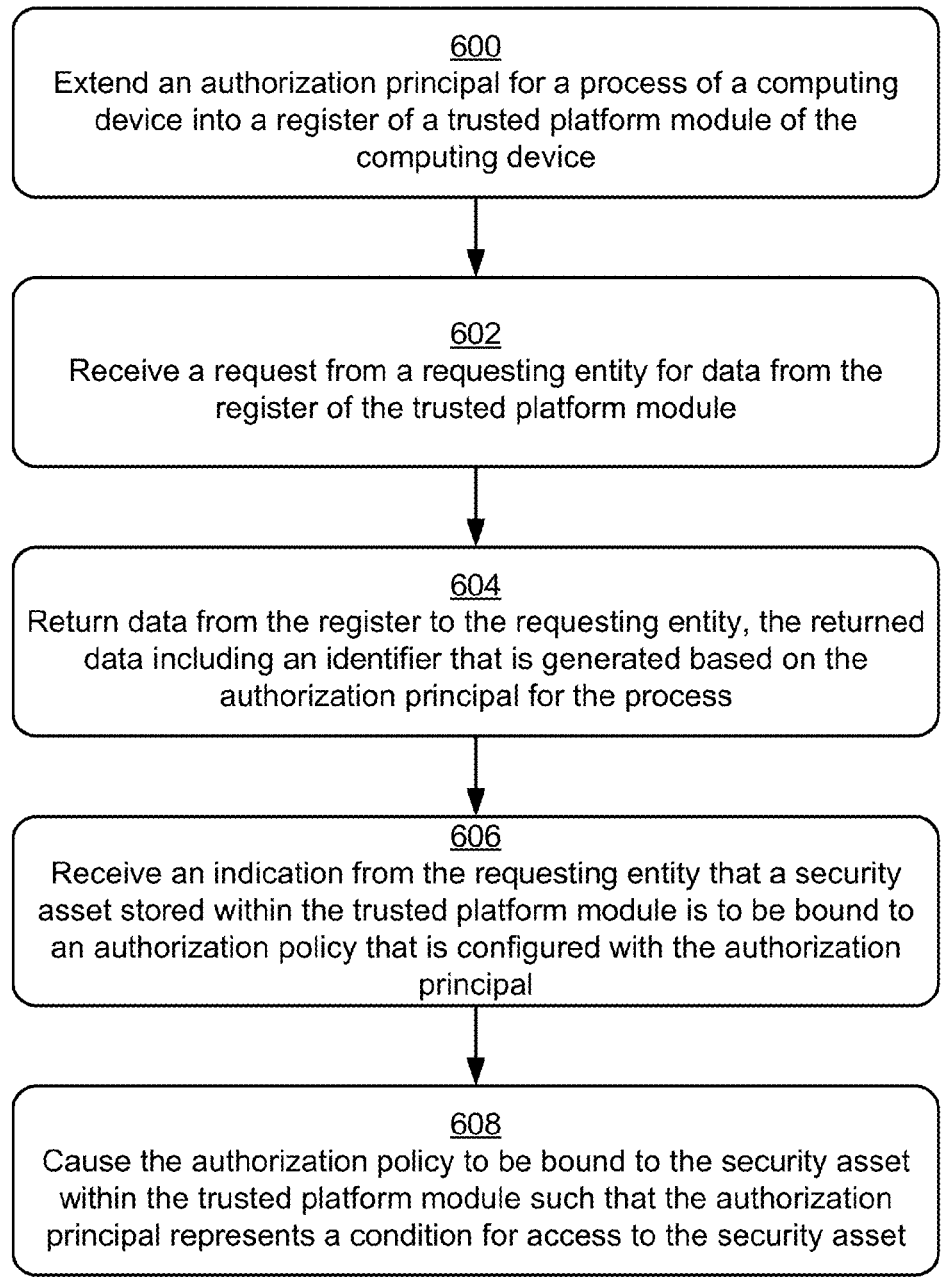
FIG. 6 is a flow diagram that describes steps in a method for causing an authorization policy to be bound to a security asset in accordance with one or more embodiments.

FIG. 6 is a flow diagram that describes steps in a method in accordance with one or more embodiments. The method, for instance, describes an example procedure for causing an authorization policy to be bound to a security asset in accordance with one or more embodiments.

Step 600 extends an authorization principal for a process of a computing device into a register of a trusted platform module of the computing device. For instance, the TPM access module 118 performs an extend operation on a particular platform register 138 that causes one or more authorization principals of the process to be extended to the register. The register, for example, corresponds to a platform configuration register (PCR) of the trusted platform module.

Step 602 receives a request from a requesting entity for data from the register of the trusted platform module. According to various implementations, the requesting entity is external to the trusted platform module, such as an application 114, a remote resource 140, and so forth.

Step 604 returns data from the register to the requesting entity, the returned data including an identifier that is generated based on the authorization principal for the process. The identifier, for instance, is generated at least in part based on an authorization principal that corresponds to an operating system context of the process. For example, as referenced above, the identifier may correspond to a principal ID 132 that is generated for an authorization principal 128. As further referenced above, a principal ID 132 may be implemented separately from an associated authorization principal 128, or alternatively as an identifier that embedded within and/or implemented as part of the associated authorization principal 132.

Step 606 receives an indication from the requesting entity that a security asset stored within the trusted platform module is to be bound to an authorization policy that is configured with the authorization principal. For instance, the TPM access module 118 receives the request from the requesting entity.

Step 608 causes the authorization policy to be bound to the security asset within the trusted platform module such that the authorization principal represents a condition for access to the security asset. The TPM access module 118, for example, interacts with the TPM 116 to configure an authorization policy for the security asset. Generally, the authorization policy specifies various conditions for access to the security asset. For instance, the authorization policy specifies access to the security asset is conditioned upon a requesting entity matching one or more authorization principals specified in the authorization policy. In at least some implementations, the authorization policy specifies multiple authorization principals that represent conditions for access to the security asset.

Having discussed some example procedures for representation of operating system context in a trusted platform module, consider now a discussion of an example system and device in accordance with one or more embodiments.

Example System and Device

Figure 7:
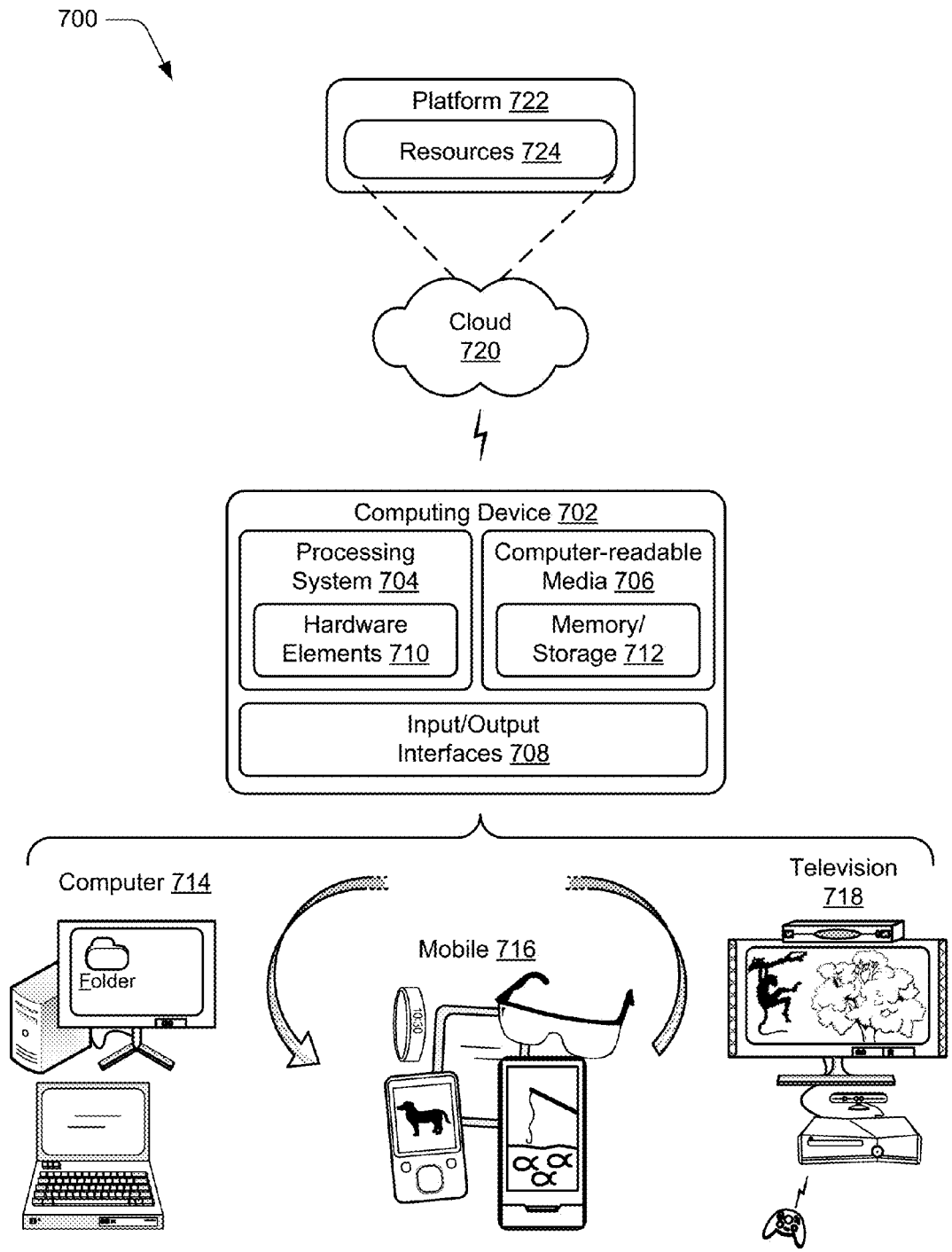
FIG. 7 illustrates an example system and computing device as described with reference to FIG. 1, which are configured to implement embodiments of techniques described herein.

FIG. 7 illustrates an example system generally at 700 that includes an example computing device 702 that is representative of one or more computing systems and/or devices that may implement various techniques described herein. For example, the computing device 102 discussed above with reference to FIG. 1 can be embodied as the computing device 702. The computing device 702 may be, for example, a server of a service provider, a device associated with the client (e.g., a client device), an on-chip system, and/or any other suitable computing device or computing system.

The example computing device 702 as illustrated includes a processing system 704, one or more computer-readable media 706, and one or more Input/Output (I/O) Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules that are executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a wearable device, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. For example, functionalities discussed with reference to the computing device 102 and/or the TPM access module 118 may be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for representation of operating system context in a trusted platform module are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   one or more processors; and
   one or more computer-readable storage media storing computer-executable instructions that, responsive to execution by the one or more processors, cause the system to perform operations including:
      causing an authorization principal that corresponds to a representation of an operating system context to be derived in a trusted platform module, the authorization principal representing a root object that enables the operating system context to be expressed to the trusted platform module, the operating system context representing one or more identity-based state conditions that occur in relation to an operating system;
      interfacing with the trusted platform module to cause the authorization principal to be bound within the trusted platform module to a security asset stored in the trusted platform module;
      receiving a request for access to the authorization principal;
      taking an action based on whether the request context matches the authorization principal, the action including one of:
         allowing access to the authorization principal in response to a request context matching the authorization principal, such that access to the security asset is allowed; or
         denying access to the authorization principal in response to the request context not matching the authorization principal, such that access to the security asset is not allowed.

2. The system as described in claim 1, wherein the operations are performed by a trusted platform module driver.

3. The system as described in claim 1, wherein the operating system context comprises one or more of a user identifier, an application identifier, a group identifier, or a privilege level.

4. The system as described in claim 1, wherein the security asset comprises one or more of a security key, a security certificate, or protected data stored within the trusted platform module.

5. The system as described in claim 1, wherein the authorization principal is bound to the security asset via an authorization policy that specifies one or more conditions for access to the security asset, the one or more conditions specifying that access to the authorization principal is a condition for access to the security asset.

6. The system as described in claim 1, wherein the request for access to the authorization principal is initiated by a process external to the trusted platform module, and wherein the request context comprises one or more of a user identifier associated with the process, an application identifier associated with the process, a group identifier associated with the process, or a privilege level associated with the process.

7. A computer-implemented method, comprising:
   receiving a request to configure an authorization policy for a security asset stored in a trusted platform module, the request identifying one or more authorization principals that individually correspond to one or more representations of one or more operating system contexts, at least one authorization principal of the one or more authorization principals representing a root object that enables an operation system context of the one or more operating system contexts to be expressed to the trusted platform module, the operating system context representing an identity-based state condition that occurs in relation to an operating system;
   causing the authorization policy to be configured in the trusted platform module with the one or more authorization principals; and
   causing the authorization policy to be bound within the trusted platform module to the security asset stored in the trusted platform module such that allowing a request for access to the security asset is conditioned on a request context matching the one or more authorization principals of the authorization policy.

8. A computer-implemented method as recited in claim 7, wherein the security asset comprises one or more of a security key, a security certificate, or protected data stored within the trusted platform module.

9. A computer-implemented method as recited in claim 7, wherein the one or more operating system contexts comprise one or more of a user identifier, an application identifier, a group identifier, or a privilege level.

10. A computer-implemented method as recited in claim 7, wherein the one or more authorization principals comprise one or more keys generated using the one or more operating system contexts.

11. A computer-implemented method as recited in claim 7, wherein the one or more authorization principals comprise multiple different authorization principals that represent access conditions for access to the security asset.

12. A computer-implemented method as recited in claim 7, further comprising:
   receiving a request for access to the security asset;
   performing an action in response to the request, including at least one of:
      allowing the request responsive to a request context of the request satisfying the authorization policy; or
      denying the request responsive to a request context of the request not satisfying the authorization policy.

13. A computer-implemented method as recited in claim 12, wherein the request for access to the one or more authorization principals is initiated by a system process, and wherein the request context comprises one or more of a user identifier associated with the system process, an application identifier associated with the system process, a group identifier associated with the system process, or a privilege level associated with the system process.

14. A computer-implemented method, comprising:
   receiving a request from a requesting entity for data from a register of a trusted platform module, the requesting entity being external to the trusted platform module;
   returning data from the register to the requesting entity, the returned data including an identifier that is generated based on an authorization principal for a process and the authorization principal corresponding to an operating system context of the process, the authorization principal representing a root object that enables the operating system context to be expressed to the trusted platform module, the operating system context representing one or more identity-based state conditions that occur in relation to an operating system;

receiving an indication from the requesting entity that a security asset stored within the trusted platform module is to be bound to an authorization policy that is configured with the authorization principal; and causing the authorization policy to be bound within the trusted platform module to the security asset stored within the trusted platform module such that the authorization principal represents a condition for access to the security asset.

15. A computer-implemented method as recited in claim 14, further comprising, prior to receiving the request from the requesting entity, causing the data to be extended into the register, the data including the authorization principal and one or more other authorization principals associated with the system process.

16. A computer-implemented method as recited in claim 14, wherein the register comprises a platform configuration register of the trusted platform module.

17. A computer-implemented method as recited in claim 14, wherein the security asset comprises one or more of a security key, a security certificate, or protected data stored within the trusted platform module.

18. A computer-implemented method as recited in claim 14, wherein the operating system context of the system process comprises one or more of a user identifier associated with the system process, an application identifier associated with the system process, a group identifier associated with the system process, or a privilege level associated with the system process.

19. A computer-implemented method as recited in claim 14, further comprising:

receiving a request to access to the authorization principal to enable access to the security asset;

performing an action in response to the request, the action including at least one of:

allowing the request responsive to one or more request contexts of the request matching the authorization principal of the authorization policy; or denying the request responsive to one or more request contexts of the request not matching the authorization principal of the authorization policy.

20. A computer-implemented method as recited in claim 14, wherein the authorization policy is configured with the authorization principal and at least one other authorization principal, the authorization principal and the at least one other authorization principal representing conditions for access to the security asset.

\* \* \* \* \*